(12) United States Patent
Yoshimura et al.

(10) Patent No.: US 10,941,065 B2
(45) Date of Patent: Mar. 9, 2021

(54) COMBINED DEHYDRATION DEVICE

(71) Applicant: ABLE CO., LTD., Saitama (JP)

(72) Inventors: Toshiki Yoshimura, Saitama (JP); Takeshi Okada, Saitama (JP); Keisuke Uchimura, Saitama (JP); Shu Ting Zhang, Saitama (JP)

(73) Assignee: ABLE CO., LTD., Saitama (JP)

( * ) Notice: Subject to any disclaimer, the term of this patent is extended or adjusted under 35 U.S.C. 154(b) by 81 days.

(21) Appl. No.: 16/325,817

(22) PCT Filed: Aug. 16, 2017

(86) PCT No.: PCT/JP2017/029424
§ 371 (c)(1),
(2) Date: Feb. 15, 2019

(87) PCT Pub. No.: WO2018/034300
PCT Pub. Date: Feb. 22, 2018

(65) Prior Publication Data
US 2019/0375663 A1 Dec. 12, 2019

(30) Foreign Application Priority Data
Aug. 17, 2016 (JP) .............................. JP2016-160160

(51) Int. Cl.
*C02F 9/00* (2006.01)
*B01D 21/01* (2006.01)
(Continued)

(52) U.S. Cl.
CPC ................ *C02F 9/00* (2013.01); *B01D 21/01* (2013.01); *B01D 33/04* (2013.01); *B01D 33/463* (2013.01);
(Continued)

(58) Field of Classification Search
CPC .......... C02F 9/00; C02F 11/123; C02F 11/15; C02F 11/121; C02F 2303/16;
(Continued)

(56) References Cited

U.S. PATENT DOCUMENTS 4,186,089 A    1/1980    Okada

FOREIGN PATENT DOCUMENTS

CN    205443026 U    *    8/2016
JP    52-008569          1/1977
(Continued)

OTHER PUBLICATIONS

CN-205443026-U; Aug. 2016, Country CN; Inventor Qu Hongfei; English translation (Year: 2016).*
(Continued)

*Primary Examiner* — Cameron J Allen
(74) *Attorney, Agent, or Firm* — Greenblum & Bernstein, P.L.C.

(57) ABSTRACT

This combined dehydration device continuously supplies primarily dehydrated sludge to a sludge supply part, the combined dehydration device including: a multiple rotary disk-type solid-liquid separation device and an electroosmosis dehydration device. In the multiple rotary disk-type solid-liquid separation device, a plurality of rotary shafts in which a plurality of rotary disks are fitted and mounted are arranged from the upstream side toward the downstream side and pivotally supported; while the rotary disks are rotated, water to be treated including sludge is supplied from over the rotary disks at the upstream side and is subjected to a primary dehydration treatment; and first dehydrated sludge on the rotary disks is fed and discharged from a sludge discharge part located at the most downstream portion of the rotary disks. In the electroosmosis dehydration device, a
(Continued)

sludge supply part is provided at the upstream side of an endless filtration fabric spread between rollers.

4 Claims, 2 Drawing Sheets

(51) Int. Cl.
    *B01D 33/04*     (2006.01)
    *B01D 33/46*     (2006.01)
    *B01D 61/42*     (2006.01)
    *C02F 11/147*     (2019.01)
    *C02F 11/143*     (2019.01)
    *C02F 11/00*     (2006.01)
    *C02F 11/121*     (2019.01)

(52) U.S. Cl.
    CPC .......... *B01D 61/427* (2013.01); *C02F 11/006* (2013.01); *C02F 11/121* (2013.01); *C02F 11/143* (2019.01); *C02F 11/147* (2019.01); *C02F 2303/16* (2013.01)

(58) Field of Classification Search
    CPC ..... C02F 11/147; C02F 11/006; C02F 11/143; B01D 21/01; B01D 33/04; B01D 33/46; B01D 61/42; B01D 61/18; B01D 63/16; B01D 61/427; B01D 33/463; B01D 61/58; B01D 35/06; B01D 61/14; B01D 2315/02; B01D 2317/08; B01D 61/46
    See application file for complete search history.

(56) References Cited

FOREIGN PATENT DOCUMENTS

| | | |
|---|---|---|
| JP | 53-141170 | 12/1978 |
| JP | 035805/1980 | 10/1981 |
| JP | H6-85845 | 11/1994 |
| JP | 2001-347109 | 12/2001 |
| JP | 2011-072863 | 4/2011 |
| JP | 2014-104461 | 6/2014 |
| JP | 5736659 | 6/2015 |
| WO | WO-2009041763 A2 * | 4/2009 ............ F26B 17/026 |

OTHER PUBLICATIONS

Official Communication issued in International Bureau of WIPO Patent Application No. PCT/JP2017/029424, dated Nov. 7, 2017.

* cited by examiner

COMBINED DEHYDRATION DEVICE

TECHNICAL FIELD OF THE INVENTION

Our invention relates to a combined dehydration device dehydrating sludge water discharged in an organic wastewater treatment process of sewage treatment plant, night-soil treatment plant or the like.

BACKGROUND ART OF THE INVENTION

Sludge water discharged in an organic wastewater treatment process of sewage treatment plant, night-soil treatment plant or the like, is ordinarily treated by the following treatment processes.

Namely, the sludge water can be coagulated and then treated into dehydrated sludge by a dehydration device, such as centrifugal separation-type dehydration device, screw-type dehydration device, filter press-type dehydration device, belt press-type dehydration device and multiple rotary disk-type solid-liquid separation device.

The dehydrated sludge, typically having a moisture content of 80 to 85%, may be subject to the final treatment such as incineration process and carbonization process, or may be converted into fuel or manure.

The dehydrated sludge obtained by the dehydration device as so-called primarily dehydrated sludge can be further treated to reduce the moisture content by an electroosmosis dehydration device.

Patent documents 1 to 3 disclose conventional electroosmosis dehydration devices in which: a sludge supply part is provided at the upstream side of an endless filtration fabric spread between rollers; an anode plate and a cathode plate, between which the endless filtration fabric is sandwiched, are installed at the downstream side of the endless filtration fabric; and while the sludge on the endless filtration fabric is pressed by the anode plate and the cathode plate, a voltage is applied across both the electrodes to perform a dehydration treatment.

When the pressing is performed while the voltage is applied across both the electrodes, positively charged moisture flows toward the cathode, so that dehydrated cake having a moisture content of 55 to 65% is obtained by the sum of the mechanical pressing force and the electric force.

The electroosmosis dehydration device became popular recently because the cost of the final treatment is reasonable while such obtained dehydrated cake has a low moisture content.

However, when the primarily dehydrated sludge discharged from a treatment device is treated by the electroosmosis dehydration device, conveying means and storing means are required to convey and store the primarily dehydrated sludge near the electroosmosis dehydration device. Further, supplying means is further required to supply such stored primarily dehydrated sludge to the electroosmosis dehydration device.

PRIOR ART DOCUMENTS

Patent Documents

Patent document 1: JP-5736659-B
Patent document 2: JP-H6-85845-13
Patent document 3: JP2014-104461-A

SUMMARY OF THE INVENTION

Problems to be Solved by the Invention

To solve the above-described problems caused in treating primarily dehydrated sludge with an electroosmosis dehydration device, it could be helpful to provide a device capable of making sludge water directly into dehydrated cake having a moisture content of 55 to 65%, without providing conveying means, storing meas and supplying means of primarily dehydrated sludge to be supplied to the electroosmosis dehydration device.

Means for Solving the Problems

We achieved our invention as finding a configuration that the dehydrated sludge discharge part of the multiple rotary disk-type solid-liquid separation device corresponds to the sludge supply part of the electroosmosis dehydration device by properly adjusting the dehydrated sludge to be discharged from laterally-aligned dehydrated sludge discharge part so that the dehydrated sludge is directly supplied to the electroosmosis dehydration device.

Accordingly, our combined dehydration device comprises a multiple rotary disk-type solid-liquid separation device and an electroosmosis dehydration device, the multiple rotary disk-type solid-liquid separation device having: a plurality of rotary shafts, which are fitted in a plurality of rotary disks, disposed from an upstream side toward a downstream side and pivotally supported; the rotary disks rotating to release a moisture through a gap between the rotary disks to perform a primary dehydration treatment from a sludge water to be supplied onto the rotary disks; and a sludge discharge part located at a most downstream portion of the rotary disks to discharge a primarily dehydrated sludge, which is obtained by the primary dehydration treatment and conveyed from the upstream side to a downstream side of the rotary disks, the electroosmosis dehydration device having: a sludge supply part provided at an upstream side of an endless filtration fabric spread between rollers; and an anode plate and a cathode plate interposing a downstream side of the endless filtration fabric for pressing the primarily dehydrated sludge on the endless filtration fabric to perform a secondary dehydration treatment while a voltage is applied across the anode and the cathode, wherein the primarily dehydrated sludge discharged from the sludge discharge part is continuously supplied to the sludge supply part of the electroosmosis dehydration device.

In our combined dehydration device, it is preferable that a lower end of the sludge discharge part and the sludge supply part are provided at the same horizontal level. When the lower end of the sludge discharge part and the sludge supply part are provided almost at the same horizontal level, the primarily dehydrated sludge can be continuously supplied to the electroosmosis dehydration device smoothly as maintaining a good shape thereof.

In our combined dehydration device, it is preferable that a shower nozzle to wash the primarily dehydrated sludge on the rotary disks is provided above the rotary disks. When the primarily dehydrated sludge is washed by using the shower nozzle, the electric conductivity of water in the dehydrated sludge can be adjusted within a proper range to prevent dehydration efficiency from deteriorating.

Effect According to the Invention

Our combined dehydration device is provided with a multiple rotary disk-type solid-liquid separation device integrated with an electroosmosis dehydration device, so that sludge water can be treated to make sludge water directly into dehydrated cake having a moisture content of 55 to 65%.

Accordingly, it is much economically advantageous to provide none of conveying means, storing means and supplying means of primarily dehydrated sludge to be supplied to an electroosmosis dehydration device.

When a shower nozzle is further provided to wash primarily dehydrated sludge on a rotary disk on its way to dehydrated sludge discharge part, even high-salt sludge water discharged from a treatment device of digestive sludge can be treated without dilution as exhibiting sufficient performance of the electroosmosis dehydration device.

EMBODIMENTS FOR CARRYING OUT THE INVENTION

Hereinafter, our invention will be explained with reference to figures.

Figure 1:
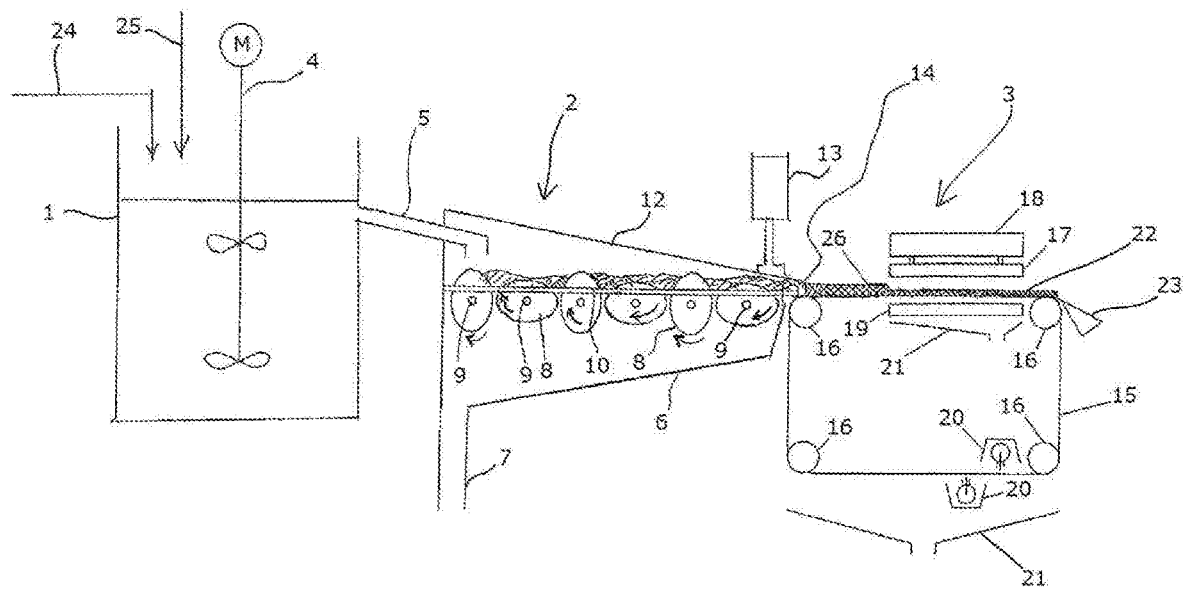
FIG. 1 is an explanation view showing an example of our combined dehydration device.

FIG. 1 is an explanation view showing an example of our combined dehydration device, where coagulation tank 1, multiple rotary disk-type solid-liquid separation device 2 and electroosmosis dehydration device 3 are installed in this order.

Coagulation tank 1 is provided with agitator 4 and is provided with an end of sludge water discharge pipe 5 communicating with the upper level of coagulation tank 1. Housing 6 of multiple rotary disk-type solid-liquid separation device 2 is provided with another end of sludge water discharge pipe 5 at the upper level of housing 6 and is provided with separated liquid releasing pipe 7 at the lower level of the housing.

In housing 6, a plurality of rotary shafts 9 in which a plurality of ellipsoidal rotary disks 8 are fitted and mounted are arranged from the upstream side toward the downstream side and pivotally supported, while fixed member 10 is provided as extending horizontally above rotary shafts 9.

Figure 2:
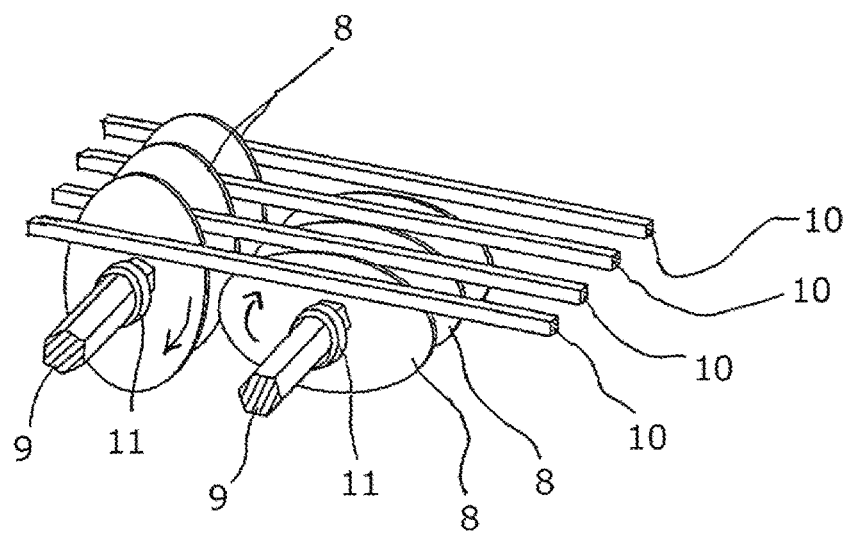
FIG. 2 is an explanation view showing an enlarged main part of multiple rotary disk-type solid-liquid separation device shown in FIG. 1.

FIG. 2 is an external view showing an enlarged main part of multiple rotary disk-type solid-liquid separation device 2, where rotary disks 8, which are fitted and mounted through spacer rings 11 in rotary shafts 9, are arranged between a plural pairs of fixed members 10.

Rotary disks 8 are designed to rotate in the same direction without contacting each adjacent rotary disk 8.

Pressure plate 12 is provided as inclining downward from the upstream side toward the downstream side above housing 6. The gap functioning as dehydrated sludge discharge part 14 between the tip of fixed member 10 and the tip of pressure plate 12 can be adjusted by lifting pressure plate with pressure mechanism 13.

Pressure mechanism 13 may be an air cylinder or the like.

FIG. 1 shows electroosmosis dehydration device 3 starting to supply treated sludge to endless filtration fabric 15 spread between rotary rollers 16 after performing an electroosmosis dehydration.

Anode plate 17 is provided above endless filtration fabric 15 at the downstream side of rotation. Anode plate 17 can be driven vertically by drive unit 18 installed above anode plate 17. Drive unit 18 may be a cylinder of oil pressure-type or air pressure-type, or alternatively an airbag.

Cathode plate 19 is provided under endless filtration fabric 15 below anode plate 17. Cathode plate 19 is fixed with strength enough to support downward pressure. Cathode plate 19 has a plurality of holes for released water dropping from the sludge to pass through. Cathode plate preferably comprises a punching metal and H-section steel or reinforcing grid below it.

Anode plate 17 and cathode plate 19 are not provided at the upstream side of rotation in the horizontal surface zone of endless filtration fabric 15 spread to secure a space to supply treated sludge.

Shower nozzles 20 are provided as sandwiching the lower part of endless filtration fabric 15 spread around. Released water receiver trays 21 are provided below cathode plate 19 and the lower endless filtration fabric 15, respectively. Rotary rollers 16 located right below anode plate 17 and cathode plate 19 are provided with scraper 23 to exfoliate dehydrated cake 22.

The lower end of dehydrated sludge discharge part 14 of multiple rotary disk-type solid-liquid separation device 2, corresponding to the downstream tip of fixed member 10 of multiple rotary disk-type solid-liquid separation device 2, is provided near endless filtration fabric 15 right above rotary roller 16 at the upstream side of electroosmosis dehydration device 3, while the lower end of dehydrated sludge discharge part 14 and the sludge supply part of the electroosmosis dehydration device are located at almost the same level horizontally.

[Operation]

Hereinafter, the operation of our combined dehydration device will be explained. Sludge water having a moisture content of about 98% is discharged from an activated sludge treatment device and is supplied through sludge water supply pipe 24 to coagulation tank 1, and is mixed by agitator 4 with organic polymer coagulant, optionally with inorganic coagulant, added through coagulant addition pipe 25, so that solid is coagulated in the sludge water.

Such coagulated sludge water is supplied through sludge water discharge pipe 5 down to rotary disks 8 at the upstream side of multiple rotary disk-type solid-liquid separation device 2.

The coagulated solid accumulates as dehydrated sludge on rotary disks 8 or fixed members 10 while water drops off through gaps of rotary disks 8 or fixed members 10. The dehydrated sludge placed on rotary disks 8 or fixed members 10 is conveyed from the upstream side to the downstream side of rotary disks 8 while removing moisture from the dehydrated sludge. The dehydrated sludge on rotary disks 8 is finally discharged through dehydrated sludge discharge part 14 being a gap between fixed members 10 and pressure plate 12.

The sludge water having a moisture content of about 98% becomes dehydrated sludge having a moisture content of about 92% on rotary disks 8 in the middle of multiple rotary disk-type solid-liquid separation device, and is further dehydrated to become dehydrated sludge having a moisture content of about 84% when it is discharged from dehydrated sludge discharge part 14. On the other hand, water is released therefrom and is discharged through releasing pipe 7.

The gap between the tip of pressure plate 12 and the tip of fixed member 10 can be adjusted by lifting pressure plate 12 with pressure mechanism, so that the thickness of dehydrated sludge discharged from dehydrated sludge discharge part 14 can be adjusted to about 10 mm as a desirable thickness to electroosmosis dehydration device 3. Then treated sludge is supplied to a sludge supply part located right above rotary rollers 16 at the side of electroosmosis dehydration device 3.

As described above, FIG. 1 shows electroosmosis dehydration device 3 starting to supply treated sludge to endless filtration fabric 15 after performing a dehydration electrically while anode plate 17 is being lifted by drive unit 18.

Then, the dehydrated sludge is supplied from dehydrated sludge discharge part 14 of multiple rotary disk-type solid-liquid separation device 2 to form treated sludge layer 26 on rotating endless filtration fabric 15. Dehydrated cake 22 formed below anode plate 17 is delivered to the downstream side by rotating endless filtration fabric 15 and is exfoliated by scraper 23.

When such supplied treated sludge layer 26 is replaced by most of dehydrated cake 22 which used to be near anode plate 17, the operation of multiple rotary disk-type solid-liquid separation device 2 is suspended to stop supplying the treated sludge and rotating endless filtration fabric 15. Such an operation makes treated sludge layer 25 formed between both electrode plates.

Then drive unit 18 is operated to press treated sludge layer 25 with anode plate 17 to perform electroosmosis dehydration process with electricity.

Our combined dehydration device is operated as briefly described above. Assuming that the lower end of sludge discharge part 14 is provided above the sludge supply part to allow the dehydrated sludge discharged from sludge discharge part 14 to drop onto the sludge supply part, electroosmosis dehydration device 3 might have a dehydration performance deteriorated by collapsing the dehydrated sludge formed in a good shape on endless filtration fabric 15. However, the lower end of sludge discharge part 14 and the sludge supply part are actually provided at almost the same level horizontally in this example, so that the dehydrated sludge discharged from sludge discharge part 14 can be smoothly supplied to the sludge supply part as maintaining its shape while maximum performance of dehydration of electroosmosis dehydration device 3 is achieved.

Our invention is not particularly limited to the example shown in FIG. 1, where multiple rotary disk-type solid-liquid separation device 2 employs ellipse rotary disk 8 and adjacent rotary disks 8 don't contact each other.

Figure 3:
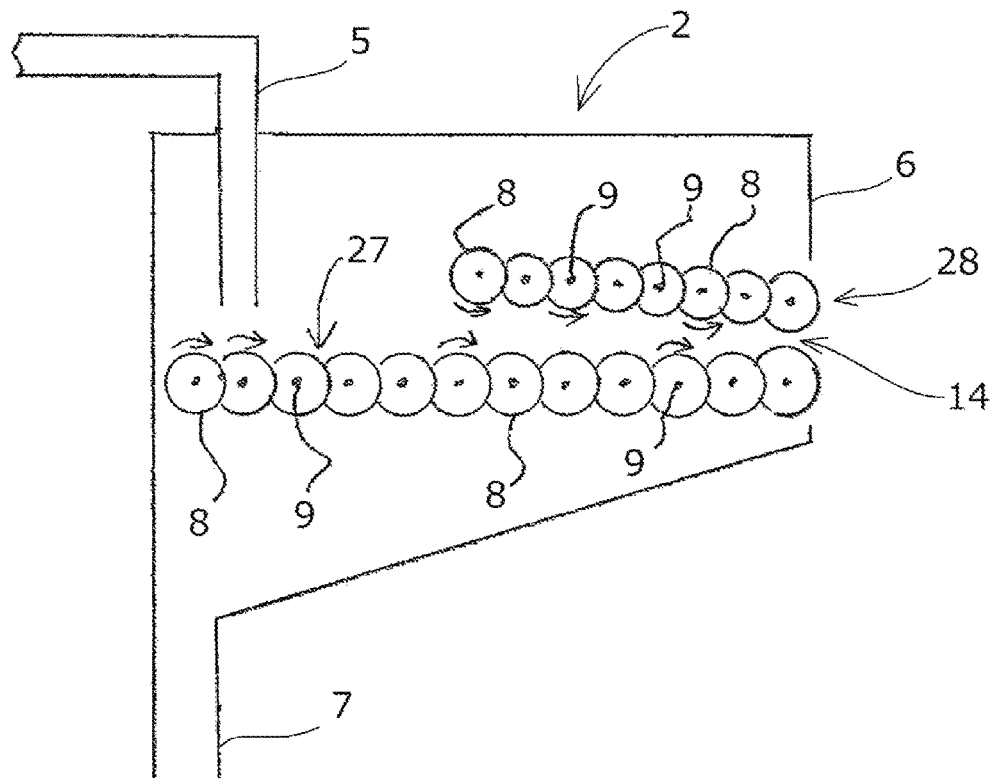
FIG. 3 is an explanation view showing another multiple rotary disk-type solid-liquid separation device applicable to our invention.

FIG. 3 shows another example of multiple rotary disk-type solid-liquid separation device. In housing 6, a plurality of rotary shafts 9 in which a plurality of circular rotary disks 8 are fitted and mounted are arranged from the upstream side toward the downstream side and pivotally supported. Lower rotary disk group 27 consists of rotary disks arranged in almost full width in housing 6 while upper rotary disk group 28 consists of rotary disks arranged in a width from the center to the downstream side only.

Further, both rotary disk groups 27 and 28 include adjacent rotary disks 8 contacting as engaging. Each rotary disk group consists of rotary disks 8 rotating in the same direction while the rotation direction of rotary disks 8 of rotary disk group 27 is opposite to that of rotary disks 8 of rotary disk group 28.

In FIG. 3, coagulated sludge water is supplied through sludge water discharge pipe 5 down to rotary disks 8 at the upstream side in lower rotary disk group 27 of multiple rotary disk-type solid-liquid separation device 2.

The coagulated solid accumulates as dehydrated sludge on rotary disks 8 while water drops off through gaps of rotary disks 8. The dehydrated sludge is conveyed on rotary disks 8 and is delivered from the upstream side to the downstream side of rotary disks 8 while reducing moisture content in the dehydrated sludge. The dehydrated sludge formed on rotary disks 8 arranged from the center to the downstream side in lower rotary disk group 27 is pressurized with rotary disks 8 in upper rotary disk group 28 and is finally discharged through dehydrated sludge discharge part 14 being a gap between rotary disk group 28 and rotary disk group 27.

Figure 4:
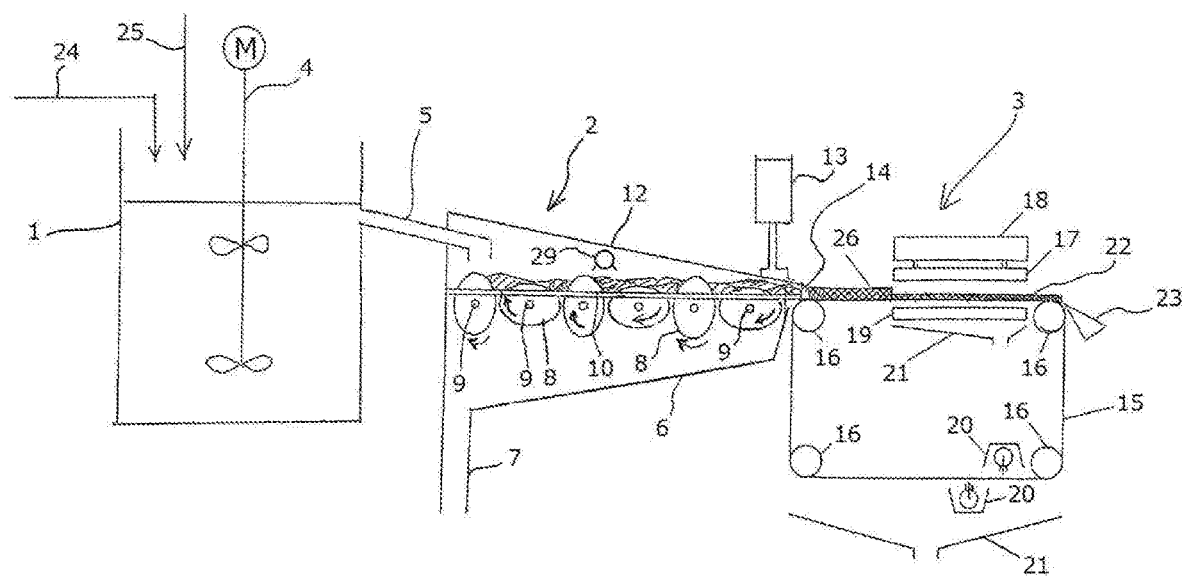
FIG. 4 is an explanation view showing another example of our combined dehydration device.

FIG. 4 is an explanation view showing another example of our combined dehydration device, where shower nozzle 29 to wash the dehydrated sludge on rotary disks 8 is provided above rotary disks 8 in the center of a plurality of rotary disks 8 in multiple rotary disk-type solid-liquid separation device 2.

Sludge water discharged from an activated sludge treatment device has an electric conductivity of 1,000 to 2,000 $\mu S/cm$. With such a low electric conductivity, the sludge water can simply be subject to a coagulation treatment, a primary dehydration treatment and a dehydration treatment with an electroosmosis dehydration device.

However, sludge water discharged from a treatment device of digestive sludge has a substantially high salt concentration corresponding to an electric conductivity of about 9,000 $\mu S/cm$. With such a high electric conductivity of sludge water, the following problem might be caused by performing a coagulation treatment, a primary dehydration treatment and a dehydration treatment with an electroosmosis dehydration device.

Namely, the dehydrated sludge containing water having an electric conductivity of 3,000 $\mu S/cm$ or more might have excessive electric current to deteriorate the dehydration efficiency of electroosmosis dehydration device.

Therefore, the sludge water should be diluted with clear water to decrease the salt concentration in advance to performing a coagulation treatment a primary, dehydration treatment and an electroosmosis dehydration treatment while the dehydrated sludge placed on the rotary disks of multiple rotary disk-type solid-liquid separation device can easily be washed.

Accordingly, the dehydrated sludge on rotary disks S is washed by ejecting cleaning water from shower nozzle 29 of multiple rotary disk-type solid-liquid separation device 2 shown in FIG. 4.

The cleaning water can permeate the dehydrated sludge to wash off salts while the washing drainage drops promptly from the gap between rotary plates 8, so that the electric conductivity of water in the dehydrated sludge can be decreased as maintaining a good dehydration efficiency. Moreover, much less quantity of water can decrease the electric conductivity than quantity of clear water to dilute the sludge water.

The water to be ejected from shower nozzle 29 may be clear Water or any water having an electric conductivity of less than 3,000 $\mu S/cm$.

Some explanations are omitted by allocating the same symbol as FIG. 1, since other configuration and operation are similar to those of the combined dehydration device shown in FIG. 1.

INDUSTRIAL APPLICATIONS OF THE INVENTION

Our combined dehydration device is widely applicable to dehydrating sludge water discharged in an organic wastewater treatment process of sewage treatment plant, night-soil treatment plant or the like.

EXPLANATION OF SYMBOLS

1: coagulation tank
2: multiple rotary disk-type device solid-liquid separation device
3: electroosmosis dehydration device
4: agitator
5: sludge water discharge pipe
6: housing
7: releasing pipe
8: rotary disk
9: rotary shaft
10: fixed member
11: spacer ring
12: pressure plate
13: pressure mechanism
14: sludge discharge part
15: endless filtration fabric
16: rotary roller
17: cathode plate
18: drive unit
19: cathode plate
20: shower nozzle
21: receiver tray
22: dehydrated cake
23: scraper
24: sludge water supply pipe
25: coagulant addition pipe
26: treated sludge layer
27: lower rotary disk group
28: upper rotary disk group
29: shower nozzle

The invention claimed is:

1. A combined dehydration device comprising a multiple rotary disk-type solid-liquid separation device and an electroosmosis dehydration device,
the multiple rotary disk-type solid-liquid separation device having:
  a plurality of rotary shafts, which are fitted in a plurality of rotary disks, disposed from an upstream side toward a downstream side and pivotally supported;
  the rotary disks rotating to release a moisture through a gap between the rotary disks to perform a primary dehydration treatment from a sludge water to be supplied onto the rotary disks; and
  a sludge discharge part located at a most downstream portion of the rotary disks to discharge a primarily dehydrated sludge, which is obtained by the primary dehydration treatment and conveyed from the upstream side to a downstream side of the rotary disks,
the electroosmosis dehydration device having:
  a sludge supply part provided at an upstream side of an endless filtration, fabric spread between rollers; and
  an anode plate and a cathode plate interposing a downstream side of the endless filtration fabric for pressing the primarily dehydrated sludge on the endless filtration fabric to perform a secondary dehydration treatment while a voltage is applied across the anode and the cathode,
  wherein the primarily dehydrated sludge discharged from the sludge discharge part is continuously supplied to the sludge supply part of the electroosmosis dehydration device.

2. The combined dehydration device according to claim 1, wherein a lower end of the sludge discharge part and the sludge supply part are provided at the same horizontal level.

3. The combined dehydration device according to claim 1, wherein a shower nozzle to wash the primarily dehydrated sludge on the rotary disks is provided above the rotary disks.

4. The combined dehydration device according to claim 2, wherein a shower nozzle to wash the primarily dehydrated sludge on the rotary disks is provided above the rotary disks.

* * * * *